United States Patent
Woodall et al.

(10) Patent No.: US 6,694,889 B2
(45) Date of Patent: Feb. 24, 2004

(54) SIPHON DRAINPIPE SYSTEM AND METHOD FOR A RAILWAY TANK CAR

(75) Inventors: Wade J. Woodall, Garland, TX (US); Stephen W. Smith, Dallas, TX (US)

(73) Assignee: TRN Business Trust, Dallas, TX (US)

(*) Notice: Subject to any disclaimer, the term of this patent is extended or adjusted under 35 U.S.C. 154(b) by 0 days.

(21) Appl. No.: 10/365,059

(22) Filed: Feb. 11, 2003

(65) Prior Publication Data

US 2003/0154879 A1 Aug. 21, 2003

Related U.S. Application Data

(60) Provisional application No. 60/357,432, filed on Feb. 15, 2002.

(51) Int. Cl.[7] .................................................. B67D 5/00
(52) U.S. Cl. ....................................... 105/358; 135/590
(58) Field of Search ................................ 105/358, 360; 406/191, 196; 137/590, 592, 587, 589

(56) References Cited

U.S. PATENT DOCUMENTS

| | | | | |
|---|---|---|---|---|
| 2,174,354 A | * | 9/1939 | Shields .................... | 222/464.7 |
| 2,708,482 A | * | 5/1955 | Nurkiewicz ................ | 169/72 |
| 3,358,295 A | * | 12/1967 | Wolfgram ................... | 4/372 |
| 4,002,192 A | | 1/1977 | Mowatt-Larssen ........... | 141/35 |
| 4,114,636 A | * | 9/1978 | Behle ........................ | 137/43 |
| 4,114,783 A | | 9/1978 | Wempe et al. .............. | 222/398 |
| 4,124,035 A | | 11/1978 | Rice ........................... | 137/128 |
| 4,184,511 A | | 1/1980 | Wilson ....................... | 137/590 |
| 4,219,047 A | | 8/1980 | Polley ........................ | 137/590 |
| 4,237,928 A | | 12/1980 | Messersmith ............... | 137/590 |
| 4,248,261 A | | 2/1981 | Carlson ...................... | 137/590 |
| 4,287,999 A | | 9/1981 | Hesterberg ................. | 220/222 |
| 4,347,863 A | | 9/1982 | Keyes ........................ | 137/212 |
| 4,371,090 A | | 2/1983 | Ogarek et al. .............. | 220/224 |
| 4,673,102 A | | 6/1987 | Bullock, Jr. ................ | 220/457 |
| 4,890,646 A | | 1/1990 | Dumser ...................... | 137/590 |
| 4,951,699 A | | 8/1990 | Lipman ...................... | 137/142 |
| 5,004,536 A | * | 4/1991 | Geisler ....................... | 210/136 |
| 5,052,437 A | | 10/1991 | Danna ........................ | 137/587 |
| 5,133,484 A | | 7/1992 | Globert et al. ............... | 222/376 |
| 5,234,016 A | | 8/1993 | Winn .......................... | 137/142 |
| 5,353,835 A | | 10/1994 | Mills .......................... | 137/590 |
| 6,076,471 A | | 6/2000 | Burian et al. .............. | 105/377.07 |
| 6,216,720 B1 | | 4/2001 | Evans, Jr. et al. ........... | 137/142 |
| 6,253,801 B1 | | 7/2001 | Lie ............................. | 141/50 |
| 6,328,064 B1 | | 12/2001 | Garfield ..................... | 137/590 |

OTHER PUBLICATIONS

Notification of Transmittal of International Search Report mailed May 30, 2003 corresponding to International Application No. PCT/US03/04536 filed Feb. 13, 2003.

* cited by examiner

Primary Examiner—Mark T. Le
(74) Attorney, Agent, or Firm—Baker Botts L.L.P.

(57) ABSTRACT

A siphon drainpipe system and method for use in a railway tank car includes a railway tank car having a tank at least partially defined by a generally elongate hollow cylinder having closed ends. The tank includes an upper surface and a lower surface, and forms a generally enclosed interior portion. A nozzle is coupled with the upper surface of the tank. A siphon pipe which extends from the nozzle toward the lower surface of the tank is coupled with the nozzle. The siphon pipe is at least partially disposed within the interior portion of the tank. In accordance with a particular embodiment of the present invention the siphon pipe includes a generally rigid, metallic portion disposed adjacent the upper surface of the tank, and a generally flexible portion disposed adjacent the lower surface of the tank.

21 Claims, 2 Drawing Sheets

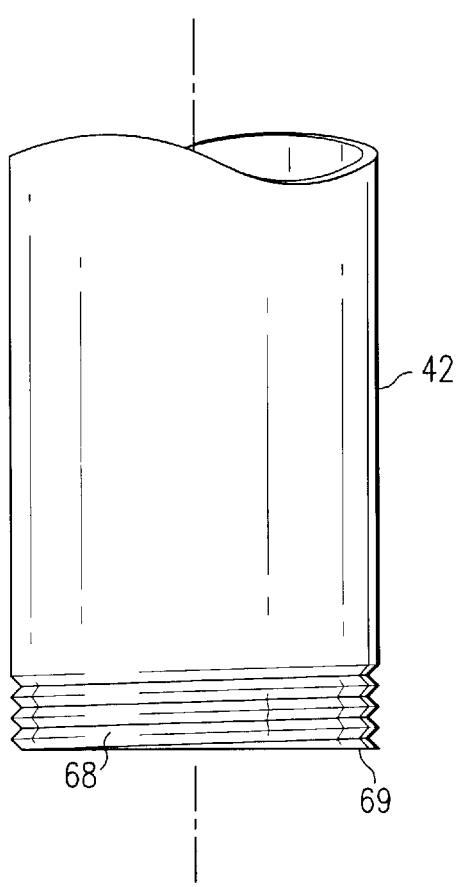
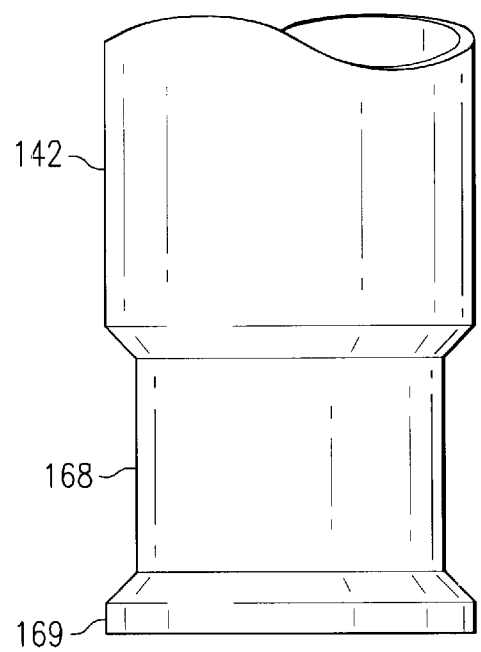
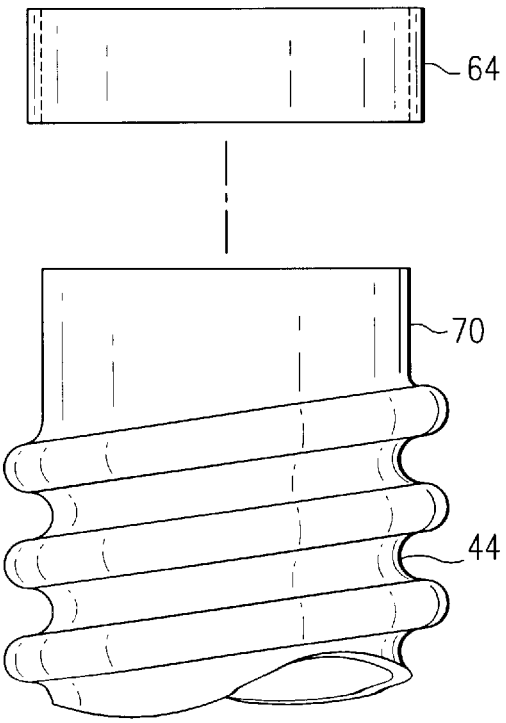
FIG. 2
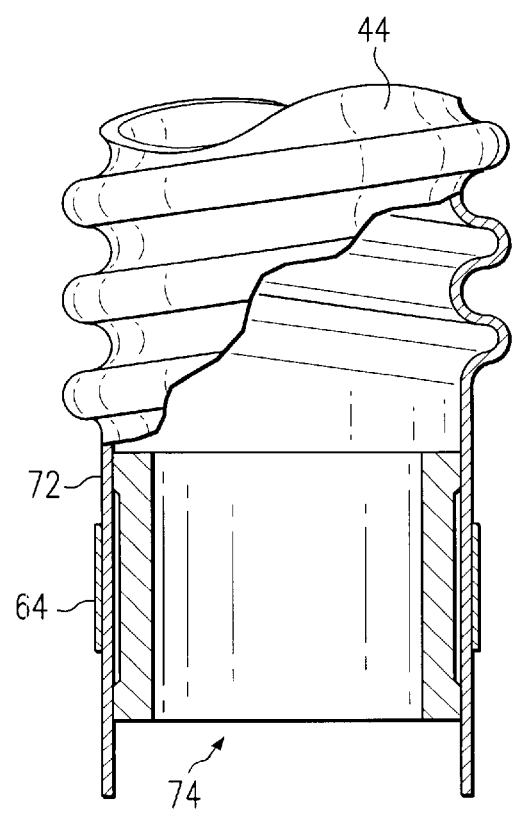
FIG. 4

SIPHON DRAINPIPE SYSTEM AND METHOD FOR A RAILWAY TANK CAR

RELATED APPLICATION

This application claims the benefit of U.S. provisional application Serial No. 60/357,432, filed Feb. 15, 2002, entitled Siphon Drainpipe System And Method For A Railway Tank Car.

TECHNICAL FIELD OF THE INVENTION

The present invention relates generally to railway tank car components, and more particularly to a siphon drainpipe system and method for a railway tank car.

BACKGROUND OF THE INVENTION

Railway tank cars are the primary means of bulk transportation of liquids in North America, and constitute about one-seventh of the North American railcar fleet. In the United States, Canada, and Mexico, 220,000 railway tank cars carry over three million shipments annually. Although tank cars are usually associated with the movement of hazardous materials, half of these shipments are non-regulated food and industrial products.

Many railway tank cars are configured for top and/or bottom loading and/or unloading. In many instances, a siphon pipe is attached to a nozzle of the railcar at an upper portion thereof. The siphon pipe may be used to load and/or unload lading. In order to achieve optimum performance during loading and unloading, the configuration of the siphon pipe and associated components must be manufactured, installed, and operated according to stringent specifications. During operation of the railway tank car, many such components are subject to damage, wear, and other problems that may affect the performance of the railway tank car and the loading/unloading system(s).

SUMMARY OF THE INVENTION

The present invention includes a siphon drainpipe system and method for use in a railway tank car that substantially eliminates or reduces disadvantages or problems associated with previously developed systems and methods. In particular, the present invention contemplates a siphon pipe having a generally flexible portion coupled with a generally rigid portion. The flexibility provided by the flexible portion prevents damage to components of the railway tank car during operation. Furthermore, the flexible portion simplifies the design, manufacture, installation, and operation of the railway tank car and the associated siphon drainpipe system.

In accordance with a particular embodiment of the present invention, a railway tank car includes a tank at least partially defined by a generally elongate hollow cylinder having closed ends. The tank includes an upper surface and a lower surface, and forms a generally enclosed interior portion. A nozzle is coupled with the upper surface of the tank, and may be coupled with a siphon pipe which extends from the nozzle toward the lower surface of the tank. The siphon pipe is at least partially disposed within the interior portion of the tank. In accordance with a particular embodiment, the siphon pipe includes a generally rigid, metallic portion disposed adjacent the upper surface of the tank, and a generally flexible portion disposed adjacent the lower surface of the tank.

In accordance with another embodiment of the present invention, the generally flexible portion of the siphon pipe comprises convoluted tubing. The generally flexible portion may include a cuffed portion configured to be coupled with the generally rigid portion. A compression band may be disposed about an exterior portion of the cuffed region. The compression band is operable to couple the generally flexible portion and the generally rigid portion. The generally rigid portion may include a recessed region being configured to receive the cuffed region of the flexible portion.

In accordance with yet another embodiment of the present invention, a method for installing a siphon drainpipe system within a tank of a railway tank car is provided. The tank is at least partially defined by a generally elongate hollow cylinder having closed ends. The tank includes an upper surface and a lower surface, and forms a generally enclosed interior portion of the tank car. The method includes coupling a siphon pipe with a nozzle coupled with the upper surface of the tank. The siphon pipe is at least partially disposed within the interior portion of the tank. In accordance with a particular embodiment, the siphon pipe includes a generally rigid, metallic portion disposed adjacent the upper surface, and a generally flexible portion disposed adjacent the lower surface of the tank.

Technical advantages of the present invention include a siphon pipe system and method for use in a railway tank car which substantially reduces or eliminates problems caused by contact between railcar tank components during operation. Many factors may lead to the deformation of the tank, or its associated components, during use. For example, loading, unloading, car movement, braking, coupling of railcars, impact with objects, and many other factors lead to the deformation of the tank and/or contact between components of the railway tank car. The generally flexible portion of the siphon pipe allows such contact to occur without damage, since the flexible portion will deform before causing damage to itself or adjacent components. This reduces the amount of repair, retrofit, and/or replacement of siphon pipe and associated components that are necessary due to such problems. Furthermore, this substantially eliminates environmental contamination experienced when such problems cause a breach of the railway tank car enclosure and allow the lading to be exposed to ambient environment.

Another technical advantage of the present invention includes a siphon pipe system and method for use in a railway tank car which may be modified and/or retrofit after installation in the car. Certain clearances are required for the proper operation of the railway tank car and associated siphon pipe system. The flexible portion of the siphon pipe of the present invention may be modified and/or trimmed in place. This prevents engineering and manufacturing errors which may occur in prefabricated systems. For example, the flexible portion of the siphon pipe may be installed in the railway tank car after other components have been installed. This allows the installer and/or operator to maintain precise tolerances between the siphon pipe and adjacent railway tank car components. Accordingly, configuration of the siphon pipe and operation of the railway tank car and siphon pipe system may be optimized.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the invention, and for further features and advantages, reference is now made

FIG. 2 illustrates an exploded view of a coupling between a generally rigid and a generally flexible portion of the siphon pipe, accomplished using a compression band, in accordance with a particular embodiment of the present invention;

FIG. 3 illustrates an alternative embodiment end condition of the generally rigid pipe of FIG. 2; and FIG. 4 illustrates a cross section, with portions broken away, of the flexible portion of the siphon pipe of FIG. 1, in accordance with yet another embodiment of the present invention.

DETAILED DESCRIPTION OF THE INVENTION

Figure 1:
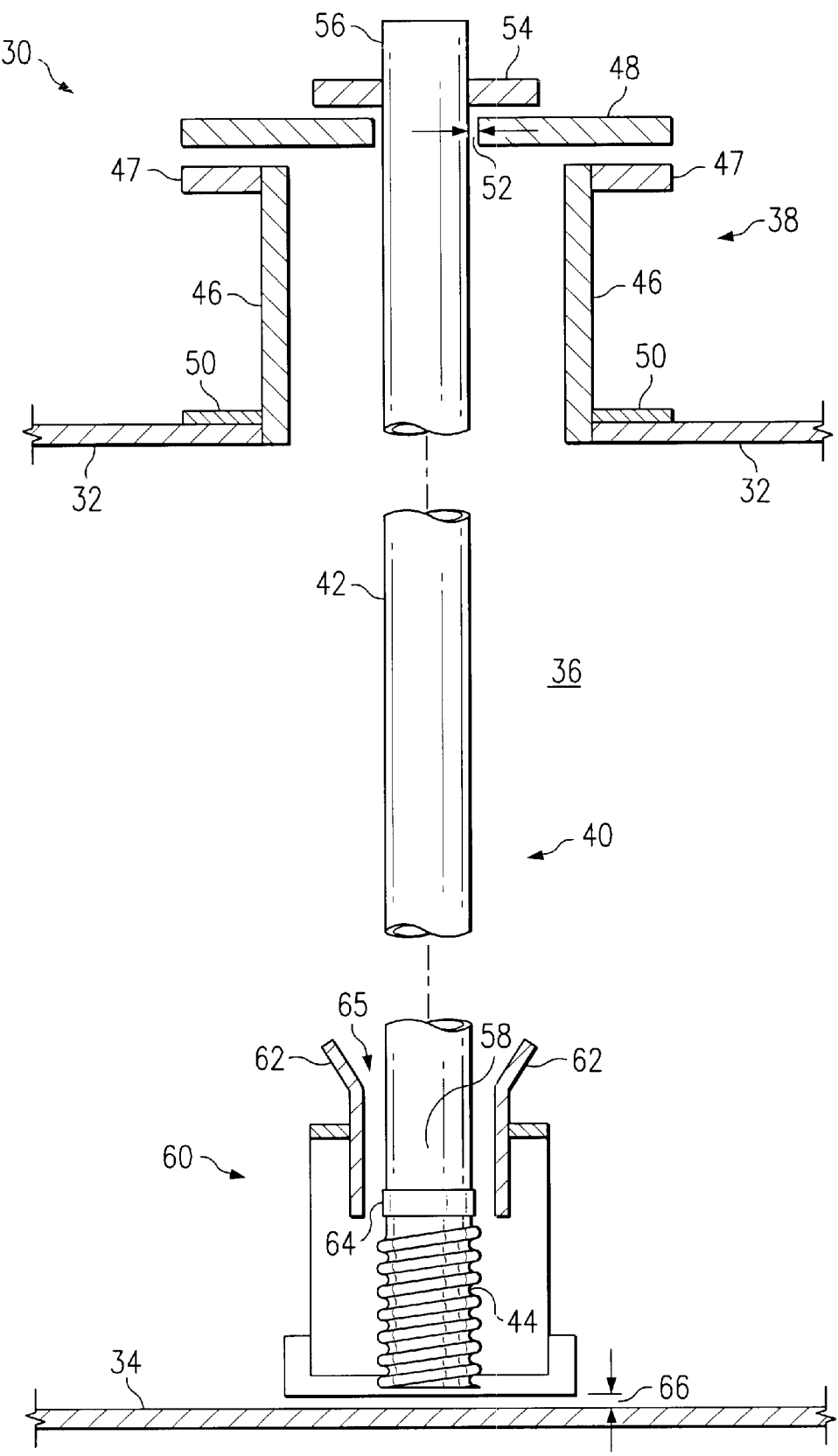
FIG. 1 illustrates a partial cross section, with portions broken away, through a railway tank car having a nozzle and a siphon pipe coupled therewith, in accordance with a particular embodiment of the present invention.

FIG. 1 illustrates a partial cross section through a railway tank car 30, having a tank being generally defined by an elongate hollow cylinder including an upper surface 32 and a lower surface 34. The tank is generally sealed at its ends. Upper surface 32 and lower surface 34 cooperate to define an enclosed interior portion 36 therebetween, for the transportation of lading. A nozzle 38 is coupled with the tank adjacent upper surface 32. Nozzle 38 is coupled with a siphon pipe 40 which extends from the nozzle 38, toward the lower surface 34 of the tank. Siphon pipe 40 is used as a conduit to insert or remove lading from interior portion 36 of railway tank car 30.

Siphon pipe 40 includes a generally rigid portion 42, which is disposed adjacent upper surface 32, and a generally flexible portion 44, which is disposed adjacent lower surface 34. While railway tank car 30 is in service, many factors contribute to the movement of siphon pipe 40 and other components of railway tank car 30, relative to each other. For reasons to be discussed later in more detail, flexible portion 44 eliminates or substantially reduces damage, wear, and other problems caused by such movement, in previous railway tank cars. Siphon pipe 40 of the present invention also provides many advantages regarding the configuration, maintenance, installation and/or retrofit of various components associated with railway tank car 30.

Nozzle 38 is coupled with upper surface 32 of railway tank car 30. Nozzle 38 includes a neck 46 which extends upward from interior portion 36. Flanges 47 extend outward adjacent a nozzle cover 48. Nozzle 38 is typically welded to upper surface 32, and reinforcing plates 50 may be provided for additional strength.

In the illustrated embodiment of FIG. 1, siphon pipe 40 extends through an opening 52 within nozzle cover 48. Other conditions may exist. Siphon pipe 40 is coupled with a mounting flange 54 which generally fixes siphon pipe 40 in place adjacent nozzle cover 48. Mounting flange 54 is removably coupled with nozzle cover 48, for example using bolts. In this manner, a first end 56 of rigid portion 42 of siphon pipe 40 is generally fixed in place adjacent nozzle 38.

A second end 58 of rigid portion 42 of siphon pipe 40 is not fixed and experiences some freedom of movement adjacent flexible portion 44. In order to limit excessive movement of rigid portion 42, a siphon pipe support 60 is coupled with lower surface 34 of railway tank car 30. Siphon pipe support 60 includes a siphon pipe guide 62 disposed adjacent second end 58 of rigid portion 42. During the installation of siphon pipe 40, siphon pipe guide 62 simplifies installation by providing a tapered "target" for the installation of the pipe. Therefore, the installer lowers siphon pipe 40 until contact with siphon pipe guide 62, and siphon pipe 40 is allowed to slide into place. During the operation of railway tank car 30, siphon pipe guide 62 prevents excessive movement of rigid portion 42. A predetermined clearance 65 is provided between siphon pipe 40 and guide 62 to allow some movement of siphon pipe 40. However, excessive movement of siphon pipe 40 is prevented when siphon pipe 40 contacts siphon pipe guide 62.

Flexible portion 44 of siphon pipe 40 is coupled with rigid portion 42 using a compression band 64. Flexible portion 44 extends from rigid portion 42 to an area adjacent lower surface 34 of railway tank car 30. A predetermined clearance 66 is provided between flexible portion 44 of siphon pipe 40 and lower surface 34. Clearance 66 is selected to allow for optimum loading and unloading of lading within interior portion 36 of railway tank car 30.

Many factors are considered in selecting the overall length of siphon pipe 40, and the height of siphon pipe support 60 and/or siphon pipe guide 62. For example, the desired clearance 66 of a particular application is one factor to consider. Also, contact between siphon pipe support 60 and/or siphon pipe guide 62, and flexible portion 44 of siphon pipe 40 should be avoided. Therefore, the height of siphon pipe guides 62 is dependent, at least in part, upon the length of flexible portion 44. In the illustrated embodiment of FIG. 1, siphon pipe support 60 and siphon pipe guides 62 are at a higher elevation with respect to lower surface 34, than in previous railway tank cars. This is done in order to avoid contact between siphon pipe guide 62 and flexible portion 44. By raising the height of siphon pipe support 60 and siphon pipe guide 62, rigid portion 42 is strengthened because there is less unsupported length than in previous systems.

In the illustrated embodiment of the present, siphon pipe support 60 extends approximately sixteen inches above lower surface 34. In alternative embodiments, siphon pipe support 60 may extend between approximately twelve inches to approximately eighteen inches above lower surface 34. Such heights of pipe support 60 avoid contact between siphon pipe support 60 and flexible portion 44, and minimize the amount of unsupported length of rigid portion 42.

During the operation of railway tank car 30, many factors contribute to the movement of various components of railway tank car 30, with respect to one another. For example, if the tank of railway tank car 30 changes shape, the distance between upper surface 32 and lower surface 34 may change. For example, if the tank is compressed, the distance between upper surface 32 and lower surface 34 may decrease. Since siphon pipe 40 is generally fixed adjacent upper surface 32, this will cause siphon pipe 40 to extend towards and possibly contact lower surface 34, or other components of railway tank car 30. The tank may change shape due to various conditions, for example during loading, unloading, car movement, cars being coupled, the application of brakes, any impact on the car, and many other factors. Tank deformation may occur a dozen or more times during a single car movement.

Flexible portion 44 of siphon pipe 40 of the present invention helps mitigate the effect of such movement and/or contact of components of railway tank car 30. In previous railway tank cars having an entirely rigid siphon pipe, such movement would often cause the siphon pipe to contact lower surface 34 of railway tank car 30. This often led to damage of the siphon pipe, tank, tank lining, siphon pipe support, siphon pipe support guides, and/or other associated components. Furthermore, significant contact between components could also cause siphon pipe 40 to force mounting flange 54 and nozzle cover 48 upward with enough force to breach the seal between enclosed interior portion 36 and ambient environment. This could cause loss of lading and potentially contaminate the environment. Also, significant repair costs were often involved. Many regulations have been promulgated by the American Association of Railroads (AAR) and other governing authorities, in order to prevent such damage.

In some applications, additional components of railway tank car 30 were located below or adjacent siphon pipe 40. For example, some applications for railway tank car 30 required an outlet valve to be coupled with lower surface 34 of railway tank car 30. Other applications require the use of a sump adjacent lower surface 34 to be used for unloading. For example, a sump may be used in lieu of a bottom outlet valve when carrying corrosive materials. For applications involving a sump or bottom outlet valve, a rigid siphon pipe 40 frequently caused damage to outlet valves and/or sumps located below or adjacent siphon pipe 40. Damage to these components could also cause loss of lading and/or environmental impacts, depending upon the severity of the impact and whether or not the seal of enclosed interior portion 36 were breached.

In order to prevent such damage, many prior art systems moved the siphon pipe off center from or away from outlet valves and/or sumps located adjacent lower surface 34. Another alternative included increasing clearance 66 between the siphon pipe and the lower surface of the railway tank car. However, by increasing clearance 66, product within enclosed interior portion 36 would be prevented from being completely emptied. This caused waste and eventually led to a condition known as "heel" at lower surface 34 of such railway tank cars.

Siphon pipe 40 of the present invention is configured to substantially reduce or eliminate many of these problems. As previously mentioned, rigid portion 42 of siphon pipe 40 is generally fixed at its first end 56. Rigid portion 42 comprises a metallic tubing, for example carbon steel or stainless steel. The material for rigid portion 42 is selected to provide the desired rigidity, as well as its compatibility with various products and lading to be shipped within enclosed interior portion 36 of railway tank car 30. The material is also selected for its fire-resistance. In fact, all primary tank sealing components of the present invention are fire-resistant, including mounting flange 54, and/or all components of siphon pipe support 60.

In an alternative embodiment, mounting flange 54 may be deleted, and siphon pipe 40 may be welded directly to nozzle cover 48. This is possible, since rigid portion 42 and nozzle cover 48 are metallic components. Also, siphon pipe 40 need not extend all the way through nozzle cover 48, and may terminate adjacent nozzle cover 48.

Flexible portion 44 of the illustrated embodiment comprises polytetrafluoroethylene (PTFE). However, other materials are available for use as flexible portion 44. PTFE was selected for its ability to service a wide range of products and materials that may be shipped within railway tank car 30. However, PTFE is not necessarily compatible with all materials that may be shipped. For example, approximately one percent of materials currently shipped may require a material other than PTFE. PTFE is suitable for the following products, which are provided by way of example only, and not by way of limitation:

| Dept. of Transportation Designation | Product |
| --- | --- |
| 2.1 | Flammable gas |
| 2.2 | Non-flammable gas |
| 2.3 | Poison gas |
| 3 | Flammable liquid |
| 5.1 | Oxidizer |
| 5.2 | Organic peroxide |
| 6.1 | Poison inhalation hazard |
| 8 | Corrosive |
| 9 | Class 9 |

Other materials suitable for use as flexible portion 44 include HDPE, PFA, and FEP. Such materials, as well as PTFE, will sustain significant compression and deformation and return to their original shape and length. Metallic materials on the other hand typically exhibit some permanent deformation under significant compression loads. Recovery is important, in order to maintain the desired clearance 66 between siphon pipe 40 and lower surface 34 of railway tank car 30. Such materials also exhibit significant flexibility when moved back and forth, for example between the cross sections of siphon pipe guide 62 shown in FIG. 1.

Ease of installation is also a consideration for selection of material for flexible portion 44. PTFE for example can be trimmed in place (while installed in car) by an installer. This is helpful because manufacturing and engineering errors may cause siphon pipe 40 to be fabricated of the wrong length, which could cause damage to the components, as discussed above, or leave a clearance that is too large or too small for practical operation. Using PTFE allows the siphon pipe to be completely installed within railway tank car 30, without installing flexible portion 44. Later, an installer can field measure and field install the flexible portion to suit the particular application and clearance desired. Furthermore, if inadequate clearance is provided between lower surface 34 and siphon pipe 40, flexible portion 44 will substantially reduce or eliminate any damage caused by contact between components, since flexible portion 44 will compress and "give" before causing any significant damage to components of railway tank car 30.

During operation of railway tank car 30, flexible potion 44 is exposed to various forces, both internally and externally. For example, when product is being unloaded through siphon pipe 40, a vacuum is formed within the interior of the siphon pipe in order to remove the product from interior portion 36. This condition exerts forces from the exterior of the siphon pipe toward the interior. Similarly, when excessive pressure builds within siphon pipe 40, the force is exerted from the inside of siphon pipe 40, outward. Therefore, flexible portion 44 must be selected to have sufficient strength to overcome these conditions.

Flexible portion 44 of the illustrated embodiment is convoluted tubing, to provide additional strength. However, other materials and configurations are available for use to form flexible portion 44. In particular embodiments, the convoluted tubing may be reinforced with wire, which extends through the convoluted tubing. The reinforcing wire may be preinstalled along the interior of flexible portion 44, or the exterior of flexible portion 44, depending upon which forces the operator expects to experience. In some applications, the convoluted tubing may be reinforced with two wires, one on the inside, and one on the outside of flexible portion 44. In still other embodiments, flexible portion 44 may comprise corrugated tubing, in lieu of convoluted tubing.

The length of flexible portion 44, for any particular application, is a function of the amount of clearance 66 desired, and the amount the designer would like for flexible portion 44 to compress. For example, particular materials available for flexible portion 44 may compress by approximately fifty percent and still return to their original length. In other words, a seven inch length of convoluted tubing will compress to three and one-half inches, without causing damage to adjacent components of railway tank car 30. Therefore, if the designer expects the distance between upper surface 32 and lower surface 34 to decrease by as much as five inches, during operation, and a clearance 66 of two inches is desired, then flexible portion 44 should be at least six inches long (it is not uncommon for a siphon pipe to move approximately five inches vertically, with respect to lower surface 34, during operation of railway tank car 30). This six inch length of flexible portion 44 will allow for three inches of compression, during operation. Therefore, with an initial clearance 66 of two inches, and three inches of compression available from flexible portion 44, railway tank car 30 can sustain a compression of the tank which causes the distance between upper surface 32 and lower surface 34 to decrease by five inches, without causing damage to siphon pipe 40 or adjacent components.

In the illustrated embodiment, the length of convoluted tubing (excluding cuffed end 70) is approximately five inches long, which allows for two and one-half inches of compression. In alternative embodiments, the length of convoluted tubing may be within the range of five inches to ten inches long. By maintaining a relatively short length of flexible portion 44, flexible portion 44 will be able to withstand greater pressures from the interior or exterior of siphon pipe 40, without compressing, or deforming under such pressure. However, the longer the length of flexible portion 44, the more likely it is to fail under excessive pressures, if all other things are held equal (e.g., materials used, length of other components, etc.). Therefore, the length of flexible portion 44, for any particular application, is a function of the amount the designer would like flexible portion 44 to compress, and the magnitude of forces the designer expects to encounter at the interior or exterior of flexible portion 44.

FIG. 2 is an exploded partial cross-section illustrating the coupling between rigid portion 42 and flexible portion 44. Rigid portion 42 includes a grooved region 68 configured to receive a corresponding cuffed end 70 of flexible portion 44. In order to couple rigid portion 42 with flexible portion 44, compression band 64 is installed over the exterior of cuffed end 70. Next, cuffed end 70 is placed over the exterior of grooved region 68 until compression band 64 is aligned with grooved region 68. Compression band 64 is then "crimped" by a process well known in the art, to secure compression band 64, cuffed end 70 and grooved region 68. It should be recognized by those of ordinary skill in the art, that many other components and methods are available to form the coupling between rigid portion 42 and flexible portion 44.

In the illustrated embodiment of FIG. 2, compression band 64 is stainless steel, and measures approximately one-half inch thick (measured from edge nearest the bottom of the page, to the edge nearest the top of the page). However, other materials, thicknesses, and orientations are suitable to form this coupling. In selecting the specific material, its compatibility with various products to be carried within enclosed interior portion 36 should be considered.

Cuffed end 70 is slightly wider than compression band 64 (for example, 2 to 2½" wide) so that cuffed end 70 can accommodate the entirety of compression band 64. Similarly, the width of grooved region 68 is sized approximately equal to the width of cuffed end 70. Cuffed end 70 is not required within the teachings of the present invention, but it provides a convenient and improved method for coupling rigid portion 42 and flexible portion 44.

FIG. 3 illustrates an alternative embodiment end condition for rigid portion 142. As illustrated in FIG. 3, a recessed potion 168 is provided in lieu of grooved region 68. Recessed portion 168 accommodates cuffed end 70 and compression band 64, and forms a secure coupling such that compression band 64 is prevented from slipping out of place. Recessed portion 168 may be formed by grinding rigid portion 42. Alternatively, rigid portion 42 may be preformed during manufacture to include recessed portion 168.

It should be noted that the configurations of rigid pipe 42 of FIG. 2 and rigid pipe 142 of FIG. 3 each include a constant exterior diameter, with the exception of the grooves formed in grooved region 68, and the recessed region 168 of rigid portion 142. For example, the rigid pipe used to form these configurations includes a constant exterior diameter prior to forming the grooves or the recessed region. A tapered end of rigid portion 42 is not required in order to couple rigid portion 42 and flexible portion 44. Accordingly, edge 69 of rigid portion 42 is approximately the same diameter as first end 56 of rigid portion 42; similarly, edge 169 of rigid portion 142 is approximately the same diameter as first end 56 of rigid portion 42.

FIG. 4 illustrates an alternative end condition for flexible portion 44, which occurs adjacent lower surface 34 of railway tank car 30. In this embodiment, a cuffed portion 72 of flexible portion 44 occurs at the edge closest to lower surface 34. A rigid collar 74 is coupled with cuffed portion 72, using a pre-formed compression band 164, similar to compression band 64. In the illustrated embodiment, rigid collar 74 is inserted into the interior portion of cuffed portion 72. However, rigid collar 74 could also be coupled at the exterior surface of cuffed portion 72. Many materials are available for forming rigid collar 74 and/or compression band 164. For example, rigid collar 74 may be formed of metallic pipe (e.g., stainless steel, carbon steel), or PTFE. Compression band 164 is a stainless steel compression band.

Rigid collar 74 is provided to reinforce the end of flexible portion 44 nearest lower surface 34. It is used to prevent crushing or deformation of flexible portion 44 caused by a vacuum at the interior, or immediately adjacent the exterior of flexible portion 44, similar to that described above with regard to the metallic wire reinforcement available for flexible portion 44.

The teachings of the present invention provide many advantages over prior siphon pipe systems and methods. For example, incorporating flexible portion 44 into the design may allow some other design changes that wouldn't otherwise meet regulations of the AAR, or other regulatory authorities. In accordance with one embodiment of the present invention, siphon pipe 40 may be designed so that clearance 66 is less than required in previous systems. Since flexible portion 44 will compress without causing damage to adjacent components, the amount of clearance 66 provided to the bottom surface 34 may be reduced.

In previous siphon pipe systems, the AAR required that the siphon pipe fail before its mounting components fail. This often required that the siphon pipe 40 be designed with a bend (point of failure) in the pipe, so that the pipe would fail before causing significant damage to other components of railway tank car 30. However, the use of flexible portion 44 provides additional clearance between rigid portion 42 and lower surface 34. Therefore, a bend (or other point of failure) in siphon pipe 40 may not be required.

Furthermore, in some applications a skid may be required at the bottom of the railway tank car, to prevent damage caused by contact with objects on the tracks. Skids are typically required if components extend below or near lower surface 34. However, the use of flexible portion 44 may allow some flexibility with such guidelines, since there is a substantial increase in the clearance between lower surface 34 and rigid portion 42. The flexibility (compressibility) of flexible portion 44 provides this additional clearance, since it will compress without causing damage to rigid portion 42, or other adjacent components of railway tank car 30. Therefore, skids may not be required when siphon pipe 40 of the present invention is used.

Although embodiments of the invention and their advantages are described in detail, a person skilled in the art could make various alterations, additions, and omissions without departing from the spirit and scope of the present invention as defined by the appended claims.

What is claimed is:

1. A railway tank car, comprising:
    a tank at least partially defined by a generally elongate hollow cylinder having closed ends;
    the tank having an upper surface and a lower surface, and forming a generally enclosed interior portion;
    a nozzle coupled with the upper surface of the tank;
    the nozzle being coupled with a siphon pipe which extends from the nozzle toward the lower surface of the tank;
    the siphon pipe being at least partially disposed within the interior portion of the tank;
    the siphon pipe having a generally rigid, metallic portion disposed adjacent the upper surface of the tank, and a generally tubular, flexible portion of a generally uniform size along the length of the flexible portion disposed adjacent the lower surface of the tank; and
    wherein the generally rigid portion and the generally flexible portion define a flow path to the nozzle.

2. The railway tank car of claim 1, wherein the generally flexible portion comprises a cuffed portion configured to be coupled with the generally rigid portion and further comprising a compression band disposed about an exterior portion of the cuffed region and being operable to couple the generally flexible portion and the generally rigid portion.

3. The railway tank car of claim 2, wherein the generally rigid portion includes a recessed region configured to receive the cuffed region.

4. The railway tank car of claim 2, wherein the generally rigid portion includes a ribbed portion configured to receive the cuffed region.

5. The railway tank car of claim 1, wherein the generally flexible portion comprises PTFE.

6. The railway tank car of claim 1, wherein the generally flexible portion comprises corrugated tubing.

7. The railway tank car of claim 1, further comprising:
    a siphon pipe support coupled with the tank; and
    wherein a height of the siphon pipe support is between twelve inches and eighteen inches above the lower surface.

8. The railway tank car of claim 1, further comprising:
    a mounting flange being operable to couple the siphon pipe and a cover plate associated with the nozzle; and
    wherein the rigid portion and the mounting flange are fabricated from a fire resistant material.

9. The railway tank car of claim 1, wherein a length of a convoluted portion of the flexible portion is five inches to ten inches.

10. The railway tank car of claim 1, wherein the rigid portion comprises stainless steel.

11. The railway tank car of claim 1, wherein the rigid portion comprises carbon steel.

12. A railway tank car, comprising:
    a tank at least partially defined by a generally elongate hollow cylinder having closed ends;
    the tank having an upper surface and a lower surface, and forming a generally enclosed interior portion;
    a nozzle coupled with the upper surface of the tank;
    the nozzle being coupled with a siphon pipe which extends from the nozzle toward the lower surface of the tank;
    the siphon pipe being at least partially disposed within the interior portion of the tank;
    the siphon pipe having a generally rigid, metallic portion disposed adjacent the upper surface of the tank, and a generally flexible portion disposed adjacent the lower surface of the tank; and
    wherein the generally flexible portion comprises convoluted tubing.

13. The railway tank car of claim 12, wherein:
    the generally flexible portion includes a first end being coupled with the generally rigid portion, and a second end disposed adjacent the lower surface of the tank; and
    the second end comprises a rigid collar.

14. A method for installing a siphon pipe system within a tank of a railway tank car, the tank being at least partially defined by a generally elongate hollow cylinder having closed ends, and including an upper surface and a lower surface, and forming a generally enclosed interior portion, comprising:
    coupling a siphon pipe with a nozzle coupled with the upper surface of the tank; and
    the siphon pipe being at least partially disposed within the interior portion of the tank, and having a generally rigid, metallic portion disposed adjacent the upper surface, and a generally tubular, flexible portion of a generally uniform size along the length of the flexible portion, disposed adjacent the lower surface of the tank; and
    wherein the generally rigid portion and the generally flexible portion define a flow path to the nozzle.

15. The method of claim 14, wherein the generally flexible portion comprises a first end being coupled with the generally rigid portion, and a second end being disposed adjacent the lower surface of the tank and further comprising coupling a rigid collar with the second end.

16. The method of claim 14, wherein the generally flexible portion includes a cuffed portion and further comprising:
    installing a compression band along an exterior portion of the cuffed portion;
    installing the cuffed portion over the rigid portion; and
    tightening the compression band to couple the rigid portion and the flexible portion.

17. The method of claim 16, wherein the generally rigid portion includes a recessed region corresponding to the cuffed portion, and further comprising installing the cuffed portion over the recessed region.

18. A method for installing a siphon pipe system within a tank of a railway tank car, the tank being at least partially defined by a generally elongate hollow cylinder having closed ends, and including an upper surface and a lower surface, and forming a generally enclosed interior portion, comprising:

coupling a siphon pipe with a nozzle coupled with the upper surface of the tank;

the siphon pipe being at least partially disposed within the interior portion of the tank, and having a generally rigid, metallic portion disposed adjacent the upper surface, and a generally flexible portion disposed adjacent the lower surface of the tank; and wherein the generally flexible portion comprises convoluted tubing.

19. A method for installing a siphon pipe system within a tank of a railway tank car, the tank being at least partially defined by a generally elongate hollow cylinder having closed ends, and including an upper surface and a lower surface, and forming a generally enclosed interior portion, comprising:

coupling a siphon pipe with a nozzle coupled with the upper surface of the tank;

the siphon pipe being at least partially disposed within the interior portion of the tank, and having a generally rigid, metallic portion disposed adjacent the upper surface, and a generally flexible portion disposed adjacent the lower surface of the tank; and trimming a length of the convoluted tubing in place, in order to achieve a predetermined clearance between the convoluted tubing and the lower surface.

20. A railway tank car, comprising:

a tank at least partially defined by a generally elongate hollow cylinder having closed ends;

the tank having an upper surface and a lower surface, and forming a generally enclosed interior portion;

a nozzle coupled with the upper surface of the tank;

the nozzle being coupled with a siphon pipe which extends from the nozzle toward the lower surface of the tank;

the siphon pipe being at least partially disposed within the interior portion of the tank;

the siphon pipe having a generally rigid, metallic portion disposed adjacent the upper surface of the tank, and a generally flexible portion disposed adjacent the lower surface of the tank; and wherein the siphon pipe support comprises a tapered siphon pipe guide.

21. A railway tank car, comprising:

a tank at least partially defined by a generally elongate hollow cylinder having closed ends;

the tank having an upper surface and a lower surface, and forming a generally enclosed interior portion;

a nozzle coupled with the upper surface of the tank;

the nozzle being coupled with a siphon pipe which extends from the nozzle toward the lower surface of the tank;

the siphon pipe being at least partially disposed within the interior portion of the tank;

the siphon pipe having a generally rigid, metallic portion disposed adjacent the upper surface of the tank, and a generally flexible portion disposed adjacent the lower surface of the tank;

a siphon pipe guide coupled with the tank; and wherein each of the rigid and flexible portions are at least partially disposed within an area defined by the guide.

* * * * *